July 9, 1968

L. W. HAAKER 3,391,801

BALANCED ARTICULATED MANIPULATOR

Filed Nov. 12, 1965

INVENTOR.
LESTER W. HAAKER
BY
Braddock + Burd
ATTORNEYS

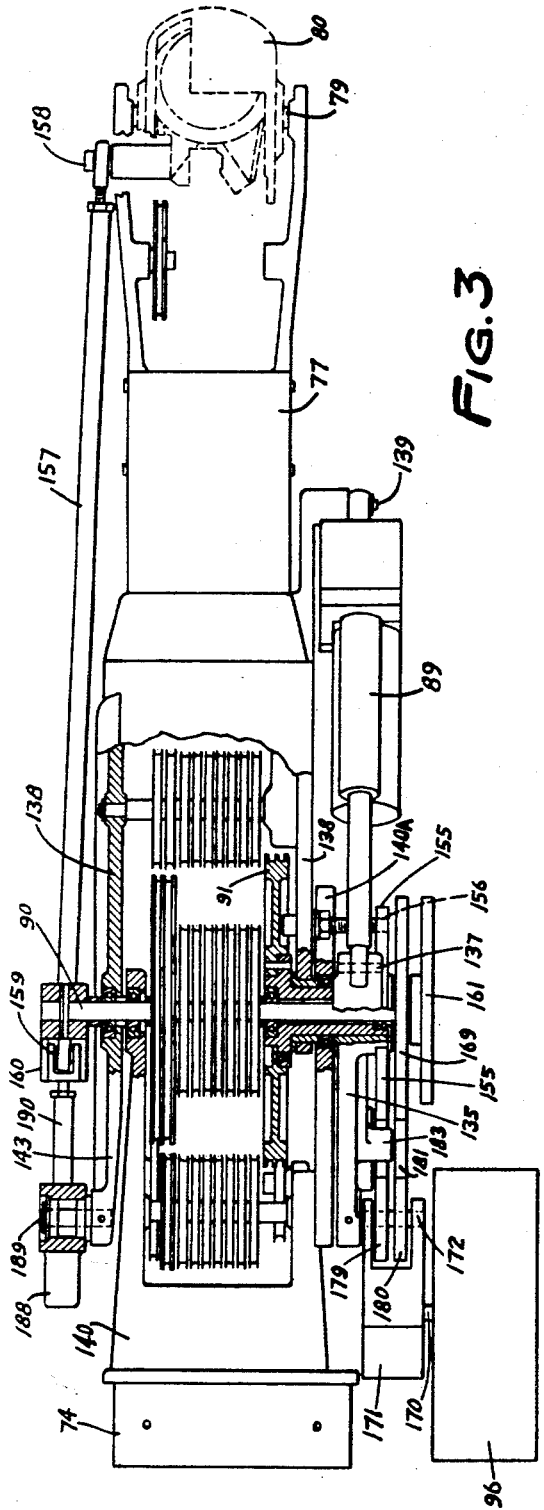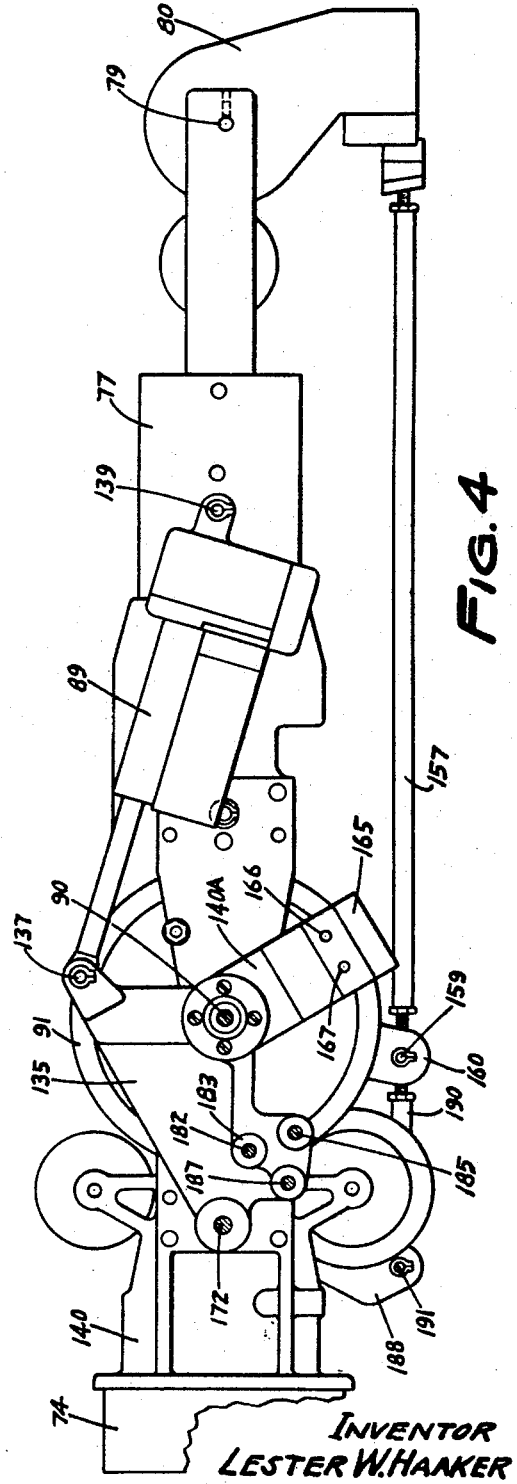

July 9, 1968

L. W. HAAKER 3,391,801

BALANCED ARTICULATED MANIPULATOR

Filed Nov. 12, 1965

INVENTOR.
LESTER W. HAAKER
BY
Braddock+Burd
ATTORNEYS

United States Patent Office 3,391,801
Patented July 9, 1968

3,391,801
BALANCED ARTICULATED MANIPULATOR
Lester W. Haaker, Red Wing, Minn., assignor to Central Research Laboratories, Inc., Red Wing, Minn., a corporation of Minnesota
Filed Nov. 12, 1965, Ser. No. 507,320
8 Claims. (Cl. 214—1)

ABSTRACT OF THE DISCLOSURE

A master-slave remote-control manipulator having articulated arms with an improved balancing system. A counterweight arm carrying a counterbalancing weight and having links movable with the master and slave arms is driven through a differential gear means to maintain the slave upper arm and fore-arm in balance both when disposed in symmetry and out of symmetry with the master upper and fore-arm.

---

This invention relates to remote-control master-slave manipulators with articulated arms, and more particularly to a system for maintaining the slave arm assembly of such a manipulator in balance through its movements regardless of the relative positions or relative displacement of the master arm and slave arm assemblies.

In United States application Ser. No. 410,470, now Patent No. 3,314,552 issued Apr. 18, 1967, there is disclosed a master-slave manipulator having a stationary wall-traversing member whose opposite ends are provided with shoulder pivots on which are articulated a master arm assembly and slave arm assembly, respectively. Each of these assemblies includes at least one upper arm and one fore-arm coupled together so as to pivot about their respective shoulders through two angles in opposite directions, subject to fixed displacement of the arms relative to one another. The master and slave fore-arms are coupled so as to pivot about their respective elbows through angles in the same direction, subject also to the possibility of fixed displacement of one arm relative to the other. The movements of a handle rotating about the longitudinal axis of the master arm, elevation and twist motions about the axes of the master wrist joint, and grasping motion are all transmitted to tong means at the end of the slave arm by means of tapes, cables, chains, belts, and the like in a manner well understood in the art.

Although the articulated manipulator described in the aforesaid application discloses a rudimentary balancing system, that system is effective for maintaining the slave arm in true balance only under severely restricted master and slave arm configuration. The balancing system is effective as to the master arm in all positions, but, when the manipulator is in normal use, complex movements occur which cannot be separated without some differential means. When further auxiliary motions are introduced by indexing the slave arm relative to the master arm the imbalance of the slave arm is further increased.

The present invention is directed to a balancing system including two differential means which together add up opposing and auxiliary motions to maintain the slave arm in near-perfect balance at all times in normal use regardless of its position relative to the master arm.

To avoid burdening the present application with needless repetition of disclosure of structure known in the art, and to the extent it may be necessary to fully understand the environment of the present invention, the substance of Ser. No. 410,470, now Patent No. 3,314,552 is incorporated herein by reference. To the extent possible, to facilitate coordination of the balancing system of the present invention with the structure of the manipulator of the aforesaid application, the same numbering system is employed.

The present invention is illustrated in the accompanying drawings in which the same numerals identify corresponding parts and in which:

FIGURE 3 is a top plan of the master upper arm and shoulder assembly of an articulated manipulator, partly broken away and partly in section;

FIGURE 4 is a side elevation of that master upper arm and shoulder assembly with foreparts omitted to show hidden structure;

Figure 1:
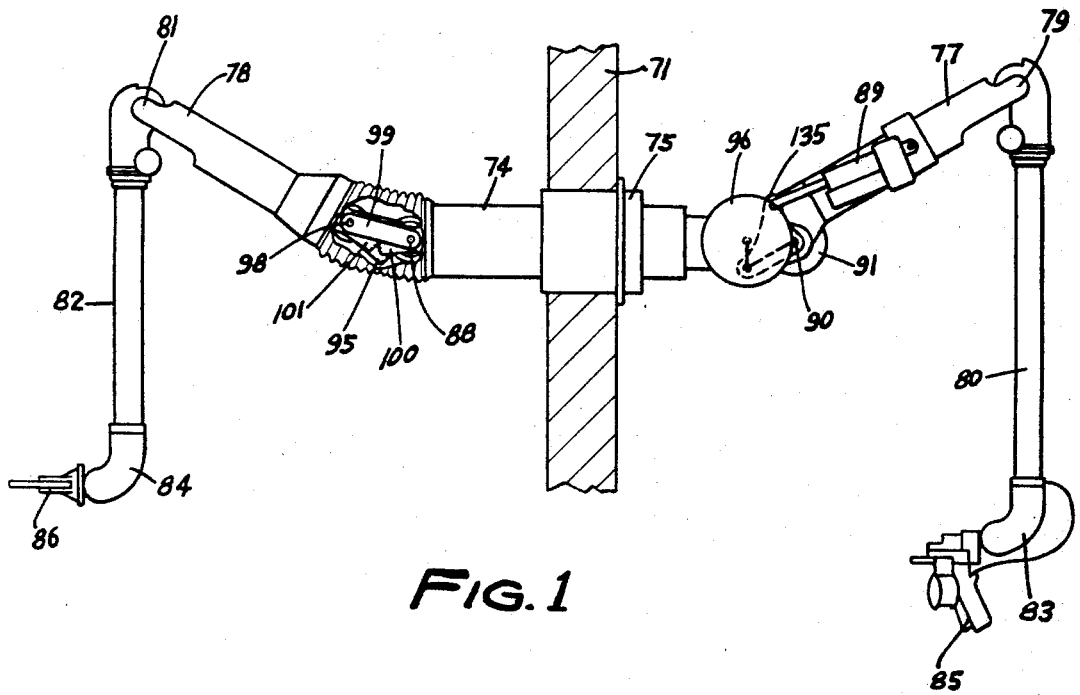
FIGURE 1 is a side elevation, partly broken away, showing an articulated manipulator installed in a barrier wall.

Referring now to the drawings and particularly to FIGURE 1 there is shown a protecting barrier wall 71 of an enclosure or "hot cell" which is provided with an opening providing a passageway for a horizontal support or through tube 74 which traverses the wall and is fitted within an annular member or roller tube 75 or provided with other means for rotation about the horizontal axis of the through tube 74. A master upper arm 77 is secured to one end of the through tube 74 at a master shoulder pivot 90 and a slave upper arm 78 is secured to the opposite end of the through tube 74 at a slave shoulder pivot 88. The master upper arm 77 and slave upper arm 78 are associated in their respective pivotal movements in such manner as to rotate through proportional angles in opposite directions. These angles can have the same value in which case the angular movements of the master upper arm 77 and slave upper arm 78 are symmetrical or the angles can be proportional but unequal either to compensate for different upper arm lengths or to vary the coverage of the slave arm with respect to that of the master arm. A master fore-arm 80 is pivotally coupled to the elbow 79 of the master upper arm 77. A slave fore-arm 82 corresponding to the master fore-arm is pivotally coupled to the elbow 81 of the slave arm 78. These two master and slave fore-arms are associated in their pivotal movements about their respective elbows in such manner as to describe porportional angles in the same direction. These angles may be equal or they may be proportional but unequal either to compensate for differential arm lengths or to vary the coverage of the slave arm with respect to that of the master arm.

The master fore-arm 80 and slave fore-arm 82 are capable of performing a movement of rotation, or so called azimuth movement, about their longitudinal axes. They are provided with wrist joints for wrist articulation respectively designated at 83 and 84. A control handle 85 is mounted on the master wrist joint 83 and a grasper or tong unit 86 is mounted on slave wrist joint 84. The three movements of rotation of the handle are transmitted to the grasper or tong unit by longitudinal movement of cables, belts, chains or other suitable means, as known in the art.

One end of a bell crank frame or arm 135 is pivotally secured to the shaft 90 which is the master shoulder pivot. A variable length actuator link 89, which is preferably an electrically operated jack, is pivotally connected at one end at pin 137 to one end of crank 135 and is pivotally connected at the other end at pin 139 at a point intermediate of the ends of master upper arm 77. A drum 91 is affixed to rotate with crank 135 about the shaft 90 of the master shoulder pivot. Master upper arm 77 is mounted for rotation about shaft 90 at its fork-like end 138.

Figure 2:
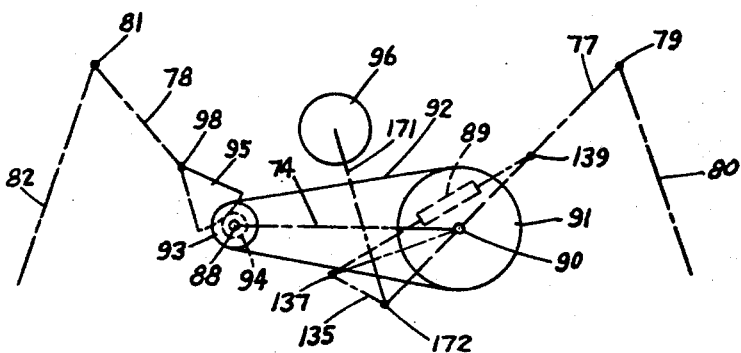
FIGURE 2 is a schematic diagram showing how movement of the master upper arm is transmitted to the slave upper arm and how relative displacement of the arms is obtained.
Figure 5:
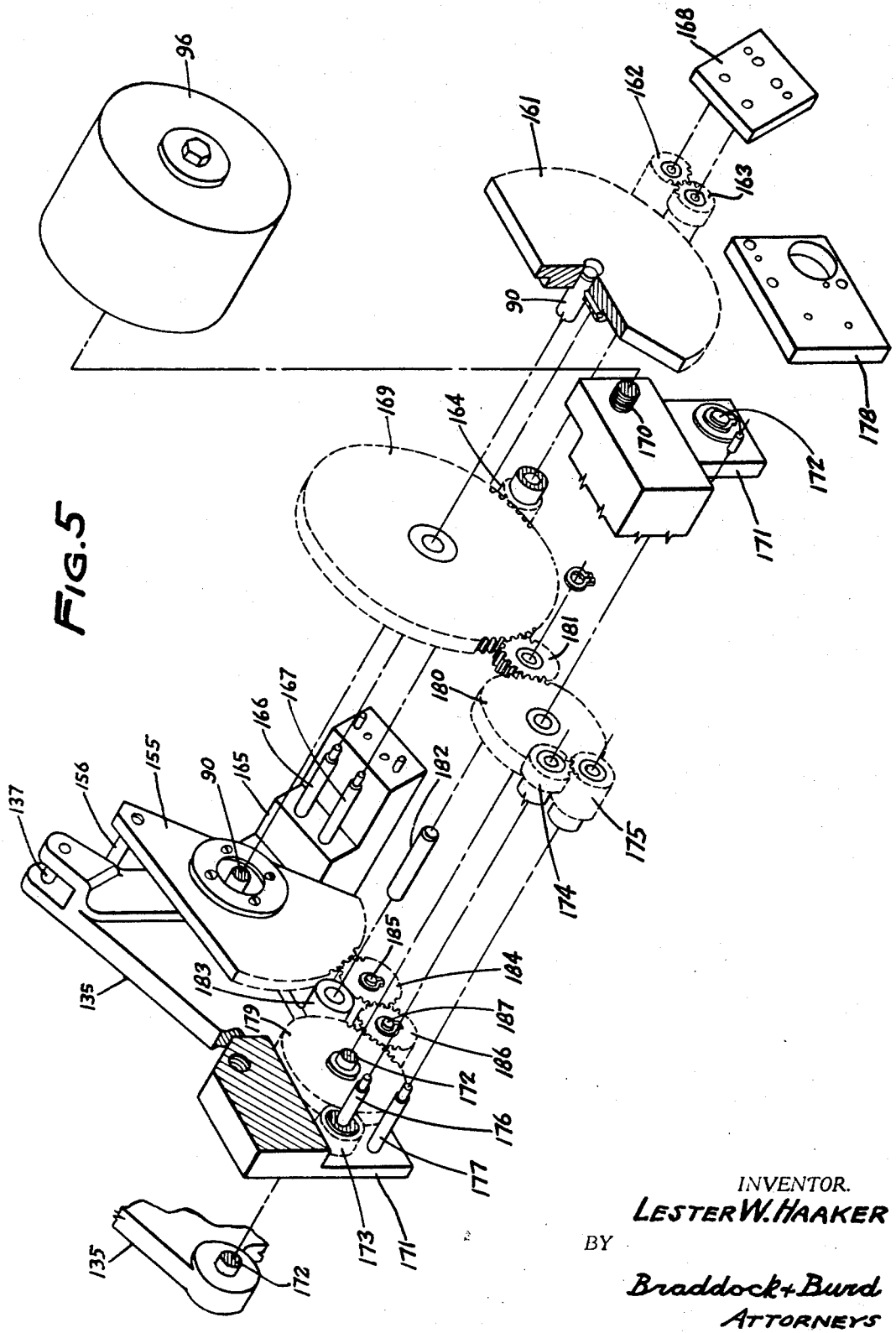
FIGURE 5 is a fragmentary perspective view of the slave arm differential counterweight drive shown in exploded form for clarity.

Actuator 89 functions as a link by which movement of master upper arm 77 about the shoulder pivot 90 may be transmitted through crank 135 to rotate drum 91 about shaft 90 to transmit similar movement to the slave upper arm 78. This is accomplished, as best seen by reading FIGURE 2 in conjunction with FIGURE 1, by means of a cable or chain 92 fixed to drum 91 and extending through the horizontal support 74 to the slave shoulder pivot where it is wound onto a smaller drum 93 mounted on the shaft of the slave shoulder pivot 88. Drum 93 is integral with a pinion 94 which meshes with a sector gear 95 which in turn is integral with the slave upper arm 78.

Toothed sector 95 rotates about shaft 98 at the shoulder end of slave upper arm 78. Shafts 88 and 98 are parallel and coupled together by a connecting arm or link 99 which constantly remains in such a position as to bisect the angle which is made by the through tube 74 and upper slave arm 78. The interaction between the through tube 74 and slave upper arm 78 is insured by means of equal toothed sectors 100 and 101 which are, respectively, integral with the through tube 74 and arm 78.

Under these conditions and in the particular case of opposite angles of radial movement of the master and slave upper arms 77 and 78, if the drum 91 has a diameter which is double that of the drum 93, the pinion 94 will have a diameter which is five times smaller than the sector 95 and the ratio of differential transmission, after engagement with the sectors 100 and 101 will be 1:2, thereby insuring a transmission through an equal and opposite angle between the drum 91 and the slave upper arm 78.

The differential slave arm balancing system is best seen by reference to FIGURES 3 through 6. A toothed sector gear 155 is anchored by means of pin 156 to one arm of the forked end 138 of master upper arm 77. Sector gear 155 is thus free to rotate about shaft 90 of the master shoulder pivot along with the master upper arm. Gear 155 senses indexing of the slave arm relative to the master arm as a result of extension or retraction of actuator 89.

Shaft 90 indicates the angle formed between master fore-arm 80 and master upper arm 77 at the master elbow 79 pivot by means of a parallel linkage including a connecting rod 157 pivotally connected to one end at 158 to master fore-arm 80 and pivotally connected at the other end at 159 to an arm or lever 160 which in turn is keyed to shaft 90. Connecting rod 157 is generally parallel to the longitudinal axis of master upper arm 77 and spaced from it.

A sun sector gear 161 of a first differential gear system is fixed to shaft 90 for rotation with it. The master elbow angle indicated through the parallel linkage to shaft 90 is transmitted from drive gear 161 through a set of first differential planet gears 162, 163 and 164 supported in a box-like planet gear carrier structure 165 fixed to a flat angle bracket 140A of the forked member 140 which terminates the through tube 74 at the master end. Planet gear 162 meshes with sun gear 161 and rotates on shaft 166. Planet gear 162 meshes with gear 163. Planet gears 163 and 164 are integral and rotate together on shaft 167 which is parallel to shaft 166. A cover plate 168 supports the ends of shafts 166 and 167 and serves to retain the gears. Planet gear 164 in turn meshes with sun gear 169 mounted on master shoulder pivot shaft 90 but independently rotatable relative to that shaft.

Slave counterweight 96 is mounted on a pin 170 supported in a radial box-like arm 171 mounted for rotation about shaft 172 carried by crank 135. Arm 171 carries planet gears 173, 174 and 175 of a second differential gear system. Planet gears 173 and 174 are carried by shaft 176 and planet gear 175 is carried by shaft 177. The free ends of those shafts are supported in a cover plate 178 secured to arm 171. Arm 171 pivots in response to rotation of sun gears 179 and 180 journalled on shaft 172 for free rotation about the same axis as counterweight arm 171. The sun gears are driven by the output of the first differential gear system and gear 155 fixed to rotate with the master upper arm about shaft 90.

The drive from the first differential gear train, in response to movement of master fore-arm 80 about elbow 79 pivot and rotation of shaft 90 and sector gear 161 is through gears 162, 163, 164 and 169 to idler pinion 181. Pinion 181 is journalled for rotation on shaft 182 which is carried by spacer hub 183 projecting from arm 135. Pinion 181 meshes with sun gear 180 which in turn meshes with planet gear 175. Planet gear 175 meshes with planet gear 174 which is integral and rotates with planet gear 173 which meshes with sun gear 179. Sun gear 179 of the second differential gear train is driven by sector gear 155 through idler pinion 184 journalled on shaft 185 which meshes with idler pinion 186 journalled on shaft 187.

It will be seen that the counterweight arm 171 carrying counterweight 96 is rotatable with crank 135 in response to movement of the slave arm 78 occasioned by movement of master upper arm 77 about shoulder pivot 90 and transmitted through actuator link 89, and in response to indexing of the slave upper arm relative to the master upper arm by reason of varying the length of the actuator link. At the same time the counterweight arm is rotatable relative to the crank arm in response to movement of the slave fore-arm about the slave elbow occasioned by movement of the master fore-arm about the master elbow and transmitted to the counterweight arm through connecting rod 157, shaft 90 and differential drive gear 161, and in response to movement of the slave upper arm occasioned by movement of the master upper arm and transmitted to the counterweight arm through differential drive gear 155. In this manner the counterweight is moved to compensate for changes in position of the slave arm assembly to maintain that assembly always in balance.

Figure 6:
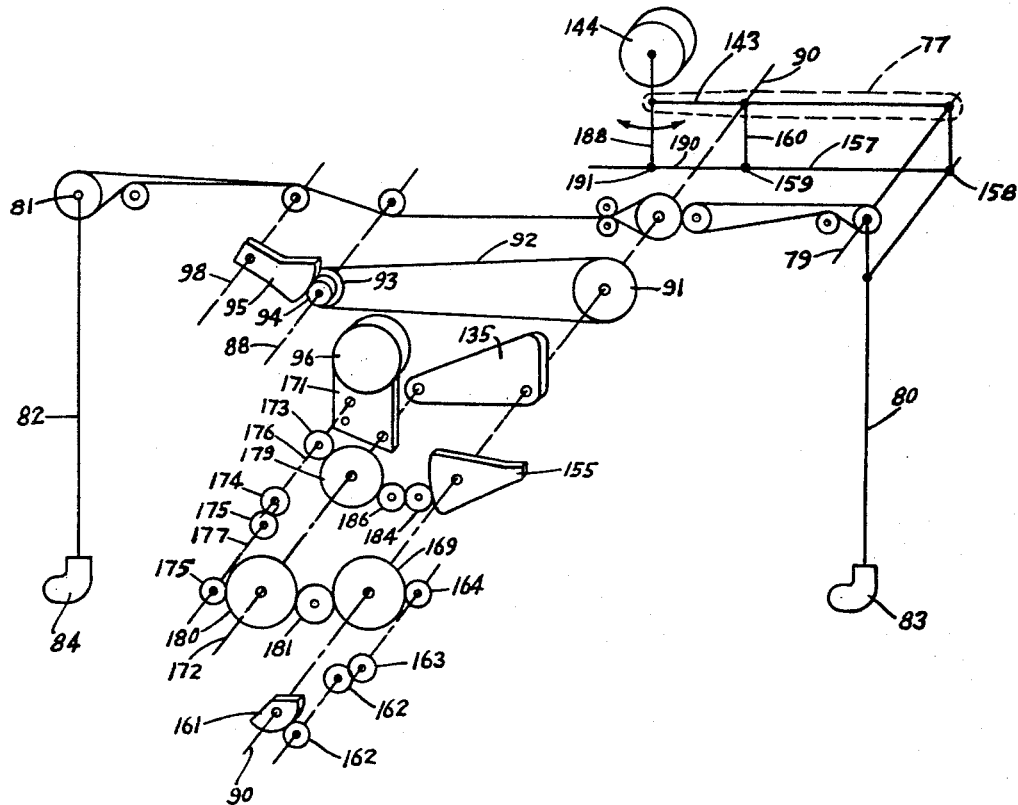
FIGURE 6 is a schematic view showing the operation of the balancing system according to the present invention.

The master arm is balanced in substantially the manner described in the aforesaid application Ser. No. 410,470. As seen in FIGURE 6, viewed in conjunction with FIGURES 3 and 4, the counterweight 144 is mounted on an arm 188 which is pivotally secured intermediate of its ends to the free end of an extension 143 of the forked portion 138 of master upper arm 77. The lower end of arm 188 is pivotally secured at 191 to a connecting link 190 whose opposite end is pivotally connected at 159 to arm 160. Link 190 is an extension of connecting rod 157. The master counterweight arm 188 is an extension of the parallel linkage which includes both the master shoulder pivot 90 and master elbow pivot 79 and is driven through this parallel linkage to balance both the master upper arm 77 and master fore-arm 80.

Balance about the horizontal axis of the through tube 74 is achieved by spacing one of the counterweights 96 or 144 out from arms 171 or 188, respectively, along the axis of the counterweight mounting pin.

To review the structure and operation of the slave counterweight system, the slave counterweight 96 is affixed to a radial arm 171 which pivots about a shaft 172 affixed in bell crank frame 135. The frame 135 pivots about the master shoulder axis 90 and is driven by a variable length actuator link 89 whose opposite end is pinned to the master upper arm 77.

Further, the crank frame 135 is rigidly affixed to a large cable drum 91 which is journalled to rotate freely about the master shoulder axis 90 and serves to drive the slave upper arm 78 in rotation about the slave shoulder axis 88 by means of interconnecting cables 92 fixed to a smaller drum 93 at the slave shoulder. This drum 93 in turn drives a spur pinion 94 meshing with a sector gear 95 fastened to the slave upper arm 78, the cable drum and gear pitch diameters being so selected as to cause the slave upper arm 78 to rotate about its shoulder axis 88 through the same angle as the drum 91 and the frame 135, but in the opposite direction.

Further, the elements of the shoulder drive system just described are so coupled that when the slave upper arm 78 lies extended in a horizontal direction in alignment with the through tube 74, the line in crank frame 135 connecting the parallel axes 172 (about which the counterweight arm 171 rotates) and the shoulder pivot axis 90 will also lie in a horizontal direction parallel with the through tube axis. Thus, if the mass of the counterweight 96 is properly chosen, the just described equal and opposite angular rotation will serve to balance the slave arm system as long as the slave elbow angle between the slave form-arm 82 and the slave upper arm 78 remains fixed.

When the aforesaid slave elbow angle between the slave fore-arm 82 and slave upper arm 78 is changed, however, the center of mass of the slave system (composed of slave upper arm 78, fore-arm 82, wrist joint 84 and tongs 86) becomes displaced and the aforesaid balance will be destroyed. The balance can be restored when the slave fore-arm 82 is rotated with respect to its upper arm 78 by a corresponding equal and opposite rotation of the counterweight 96 about the axis 172, provided the counterweight is offset a suitable distance from the axis 172.

It is the function of the differential gear train to provide the necessary auxiliary rotation about the axis 172 to maintain the slave system in equilibrium under all conditions of slave end articulation and rotation about the through tube axis. Since there is no component of the system at the master end which provides directly the desired information, the elbow angle between slave upper and fore-arms, the drive system must be adapted to synthesize the desired angular displacement by suitably combining the available complex master end motions and then conveying this angular displacement to the counterweight support which is itself rotating with the bell crank frame 135 about the master shoulder axis 90.

The condition which is required for maintenance of balance of the slave arm assembly is that the angle of the counterweight arm 171 with respect to a line between axes 172 and 90 in frame 135 is equal to the slave forearm angle at the slave elbow with respect to the slave upper arm. The angle of the counterweight arm 171 with respect to the line between axes 172 and 90 in frame 135 must be derived from master end angles, synthesized and coupled by the gear train to the counterweight arm on crank frame 135. The crank frame 135 pivots about the master shoulder axis 90 and the line between axes 90 and 172 forms the angle of the crank frame with the horizontal through tube axis.

Angular information is transmitted from the manipulator to the bell crank frame 135 by means of three coupling elements as follows:

(1) A planet gear carrier 165 mounted on a flat angle bracket 140A fixed to the forked member 140 at the master end of the horizontal through tube 74 rotates about master pivot axis 90 relative to the crank frame through an angle equal to the angle between the crank frame and horizontal, but in the opposite direction.

(2) Sun gear 161 driven by link 160 from the master fore-arm 80 rotates about shoulder axis 90 relative to the crank frame through an angle representing the difference between the sum of the angles of the master elbow and the elevation of the master upper arm above the horizontal and the angle between the counterweight bell crank frame and horizontal.

(3) Drive gear 155 fixed by a pin to the master upper arm 77 rotates about the master shoulder axis 90 relative to the crank frame through an angle equal to the angular indexing of the slave upper arm relative to the master upper arm, but in the opposite direction.

The input to the first differential train comprising sun gears 161 and 169 and planets 162, 163 and 164, which are carried for rotation about axes in planet carrier 165, are at the sun gear 161 and planet carrier. The resulting rotation of the output gear 169 is transmitted to sun gear 180 of the second differential train through idler pinion 181 as a rotation about the axis 172. The other sun gear 179 of the second differential train is driven by sector drive gear 155 through the two idler pinions 184 and 186 as a rotation about axis 172. The output of the second differential is the planet carrier (carrying planet gears 173, 174 and 175) which is an integral part of the counterweight arm 171 to maintain the angle of the counterweight arm with respect to the line between axes 172 and 90 equal to the slave fore-arm angle at the slave elbow relative to the slave upper arm to maintain the slave arm assembly in balance.

If the master-slaveshoulder and/or elbow drive ratios are not 1:1, the bell crank frame 135 is no longer directly connected to the drive pulley 91 but may be coupled through suitable gearing to maintain the angle between the bell crank frame and horizontal equal to the angle betwene the slave upper arm and horizontal. Additional appropriately selected gearing is then introduced between the input members 161, 165, 155 and the output differential train sun gears 180 and 179 in order to preserve the required equality between the angle of the counterweight arm relative to the crank frame through axes 172 and 90 and the slave fore-arm angle subtended at the slave elbow relative to the slave upper arm. So long as lateral rotation or side canting is introduced between the master arm assembly and master shoulder pivot, then the system as described will maintain the slave assembly in balance at all times. If lateral rotation is introduced elsewhere, then auxiliary balancing means must also be introduced.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In a master-slave manipulator having articulated arms comprising a generally horizontal support adapted to traverse a barrier wall, a master upper arm attached at one end to one end of said support at a shoulder pivot and having a master fore-arm attached at the other end at an elbow pivot, a slave upper arm attached at one end to the opposite end of said support at a shoulder pivot and having a slave fore-arm attached at the other end at an elbow pivot, said upper arms being coupled to pivot about their respective shoulders through angles in opposite directions and said fore-arms being coupled to pivot about their respective elbows through angles in the same direction, handle means at the end of said master fore-arm and grasping means at the end of said slave fore-arm, said handle and grasping means being coupled together for transmission of the movement of the handle to the grasping means, the improvement which resides in balancing means for maintaining said slave upper arm and fore-arm in balance when disposed both in symmetry with said master upper arm and fore-arm and out of symmetry therewith, said balancing means including:

(A) a compound counterweight arm consisting of at least two links having a counterweight mass carried off-center thereon, (B) the first link of said arm being rotatable about said master shoulder pivot through an angle equal to the rotation of the slave upper arm about the slave shoulder pivot, (C) another link of said arm carrying the counterweight and being rotatable about the first link through an angle equal to the angle formed by the slave fore-arm and the slave upper arm, and (D) differential gear means to drive said counterweight arm in response to movements of the master upper arm, master fore-arm and auxiliary indexing movements of the slave upper arm relative to the master upper arm to produce said angles.

2. A manipulator according to claim 1 further characterized in that said balancing means includes (A) a first differential gear train responsive to movement of the master and slave fore-arms about their respective elbows through angles in the same direction, to movement of the master and slave upper arms about their respective shoulders through angles in the opposite directions, and to auxiliary indexing movement of the slave upper arm relative to the master upper arm, (B) a second differential gear train coupled thereto and independently responsive to movement of the master and slave fore-arms about their respective elbows through angles in the same direction, to movement of the master and slave upper arms about their respective shoulders through angles in the opposite directions, and to auxiliary indexing movement of the slave upper arm relative to the master upper arm.

3. A manipulator according to claim 3 further characterized in that (A) said first differential gear train includes a pair of sun gears rotating about the master shoulder axis and interconnecting planet gears in a carrier, (B) said first differential gear train having inputs at one sun gear and at the planet carrier and output at the other sun gear, (C) the planet carrier being responsive to motion of the first counterweight arm link about the master shoulder pivot, (D) the input sun gear being responsive to movements of the master upper arm and master fore-arm, (E) said second differential gear train including a pair of sun gears rotating about a second parallel axis carried in the first counterweight arm link and interconnecting planet gears in a carrier rotating about the same axis, (F) said second differential gear train having inputs at the two sun gears and output at the planet carrier, (G) said planet carrier driving the other counterweight arm link, (H) the first sun gear of said second differential gear train being responsive to output of the first differential gear train, and (I) the second sun gear of said second differential gear train being responsive to indexing motion of the slave upper arm relative to the master upper arm.

4. A manipulator according to claim 3 further characterized in that (A) the input sun gear of said first differential gear train is fixed to a shaft rotatable about the master shoulder axis, the output sun gear is rotatable about said shaft and the interconnecting planet gears are carried on the manipulator horizontal support, and (B) the sun gears of said second differential gear train are rotatable about the axis of rotation of the other link of said counterweight arm and interconnecting planet gears are carried by that counterweight arm link.

5. A manipulator according to claim 4 further characterized in that (A) the first link of said counterweight arm is a bell crank which is both pivoted about the master shoulder axis and fixed to coupling means by which movement of the master upper arm is transmitted to the slave upper arm, (B) said crank is coupled through a variable length link to said master upper arm, and (C) the other link of said counterweight arm is pivotally secured to said crank.

6. A manipulator according to claim 5 further characterized in that (A) a drive gear for second differential gear train is affixed to said master upper arm for rotation about the master shoulder axis, and (B) said drive gear is coupled to one of the sun gears of said second differential gear train through a pair of idler pinions.

7. A manipulator according to claim 6 further characterized in that said first and second differential gear trains are coupled through an idler pinion disposed between the output sun gear of said first differential and the other of the sun gears of said second differential which is not coupled to said drive gear.

8. A manipulator according to claim 1 further characterized in that said balancing means includes (A) a bell crank pivoted about the master shoulder axis and fixed to coupling means by which movement of the master upper arm is transmitted to the slave upper arm, (B) a variable length link coupling said crank to the master upper arm, (C) a radial counterweight arm pivotally secured to said crank on an axis parallel to and spaced from said master shoulder axis, (D) a counterweight mass affixed off-center to said arm, (E) a shaft rotatable on said master shoulder axis responsive to transmission of movement of the master elbow and master upper arm to the slave arm, (F) a first differential gear train including a sun gear driven by said shaft, a sun gear rotatable about said shaft and interconnecting planet gears carried on the manipulator horizontal support, (G) a second differential gear train including a pair of sun gears rotatable about the axis of rotation of said radial arm and interconnecting planet gears carried by said radial arm, (H) means coupling said differentials, (I) a drive gear rotatable about said shoulder axis with the master upper arms, and (J) coupling means between said last named drive gear and said second differential.

References Cited

UNITED STATES PATENTS 3,314,552  4/1967  Vertut _____ 214—1

ROBERT G. SHERIDAN, *Primary Examiner.*

UNITED STATES PATENT OFFICE
CERTIFICATE OF CORRECTION

Patent No. 3,391,801                        July 9, 1968

Lester W. Haaker

It is certified that error appears in the above identified patent and that said Letters Patent are hereby corrected as shown below:

Column 6, line 23, "betwene" should read -- between --. Column 7, line 27, the claim reference numeral "3" should read -- 2 --.

Signed and sealed this 16th day of December 1969.

(SEAL)
Attest:

Edward M. Fletcher, Jr.                    WILLIAM E. SCHUYLER, JR.

Attesting Officer                                Commissioner of Patents